United States Patent [19]
Goto

[11] Patent Number: 5,164,209
[45] Date of Patent: Nov. 17, 1992

[54] TOGGLE TYPE MOLD CLAMPING SYSTEM

[75] Inventor: Tomiyasu Goto, Nagoya, Japan

[73] Assignee: Okuma Corporation, Japan

[21] Appl. No.: 794,234

[22] Filed: Nov. 19, 1991

[30] Foreign Application Priority Data

Nov. 22, 1990 [JP] Japan ................... 2-320229

[51] Int. Cl.⁵ ........................... B28B 1/00
[52] U.S. Cl. ............................. 425/451.6
[58] Field of Search .......... 425/451.5, 451.6

[56] References Cited

U.S. PATENT DOCUMENTS 4,273,524 6/1981 Smith ............... 425/451.5
4,337,002 6/1982 Laurent et al. ........... 425/451.6

FOREIGN PATENT DOCUMENTS 1-280521 10/1989 Japan .
1-255516 11/1989 Japan .

*Primary Examiner*—Bernard Nozick
*Attorney, Agent, or Firm*—Evenson, Wands, Edwards, Lenahan & McKeown

[57] ABSTRACT

A toggle type mold clamping system is used for a vertical injection molding machine, including a toggle link mechanism. The toggle link mechanism has a pair of toggle rods (7A, 7B), a pair of toggle arms (9A, 9B) in the shape of a sideways V, and drive means (13A, 13B, 14, 15). Opposite ends of the toggle rods are pivotally coupled to an intermediate panel 2 and one end each of the toggle arms, respectively. At bends thereof, the toggle arms are pivotally coupled to a lower panel. The drive means is coupled to the lower ends of the toggle arms. The toggle arms are operated by the drive means to open and clamp molds. With this arrangement, the driving force can be effectively used to open and clamp the molds, thereby reducing the size of the drive means, and space in the lateral direction.

5 Claims, 6 Drawing Sheets

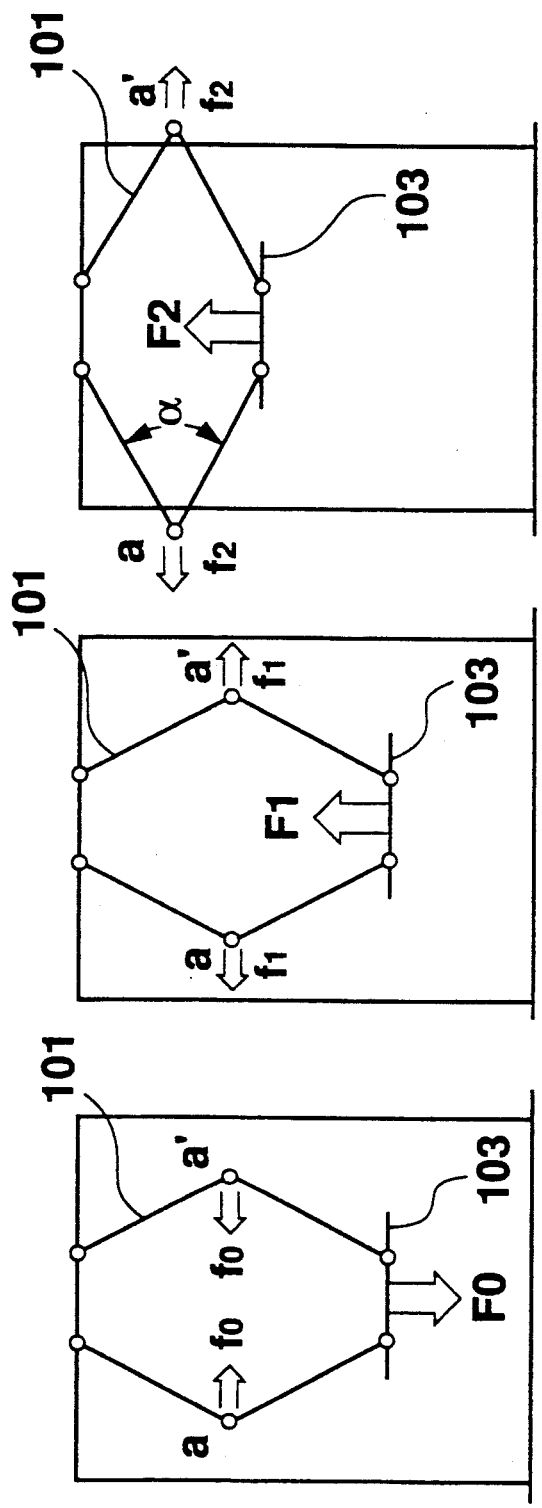
Fig. 6 (A) PRIOR ART
Fig. 6 (B) PRIOR ART
Fig. 6 (C) PRIOR ART

TOGGLE TYPE MOLD CLAMPING SYSTEM

BACKGROUND OF THE INVENTION

1. Field of the Invention

This invention relates to a toggle type mold clamping system for a vertical injection molding machine.

2. Description of the Related Art

FIG. 5 of the accompanying drawings shows the configuration of a conventional toggle type mold clamping system comprising a toggle link mechanism. The toggle link mechanism includes a pair of two links 101 connected by joints. Opposite ends of the links 101 are connected to an intermediate panel 102 and a lower panel 103, respectively. The joints are linked to a threaded shaft via screw balls, and the output shaft of a motor is connected to the threaded shaft. The threaded shaft and the screw balls function as a mechanism for driving the toggle link mechanism. A pair of molds 105 mounted on the intermediate panel 102 and an upper panel 104, respectively, are opened and clamped by operating the toggle link mechanism.

With this toggle type mold clamping system, the lower panel 103 bears the whole weight of an injection molding unit and the upper panel 104. As shown in FIG. 6(A), the drive mechanism exerts a thrust $f_0$ in the direction to reduce the distance between the joints a, a′, thereby clamping the injection molds with a force $F_0$. On the other hand, the drive mechanism exerts a thrust $f_1$ in the direction to increase the distance between the joints a, a′, thereby opening the injection molds with a force $F_1$ as shown in FIG. 6(B). When the foregoing weight is heavy, the thrust $f_1$ should be larger than the thrust $f_0$. At the final stage of the mold opening process, the links 101 are bent with an angle $\alpha$ as shown in FIG. 6(C). When the mold opening thrust $f_2$ is equal to the thrust $f_1$ in such a case, the mold opening force $F_2$ is smaller than the mold clamping force $F_0$. Therefore, the thrust $f_{2'}$ of the drive mechanism needed to open the mold or to keep the mold open should be very large as shown in FIG. 6(C). Sometimes the thrust $f_{2'}$ is larger than the mold clamping thrust $f_0$. A motor having a large torque is required to turn the threaded shaft and to obtain the thrust $f_{2'}$ for generating the force $F_2$.

To overcome this problem, the larger the minimum bending angle $\alpha$ of the toggle links, the smaller the mold opening stroke. To ensure a sufficient mold opening stroke, the links should be longer, which will extensively enlarge the mold clamping system.

SUMMARY OF THE INVENTION

It is therefore an object of this invention to provide a toggle type mold clamping system which is compact and can be operated by a motor with a small torque, thereby overcoming the foregoing drawbacks.

According to this invention, there is provided a toggle type mold clamping system, comprising: an upper panel for holding an upper mold; a stationary intermediate panel for holding a lower mold; a frame for supporting the intermediate panel; a lower panel coupled to the upper panel via a plurality of tie rods; a toggle link mechanism including a pair of toggle rods whose ends are pivotally coupled to the intermediate panel and a pair of toggle arms which are in the shape of a sideways V and pivotally supported between the intermediate and lower panels; and a drive mechanism for driving the toggle link mechanism, the driving mechanism being coupled to the ends of the two toggle arms.

In operation, when a threaded shaft unit having a left-handed shaft and a right-handed shaft is turned by a motor, the ball screws coupled to the lower ends of the toggle arms are moved outwardly so as to be apart from each other, the joints at the upper ends of the toggle arms turn inwardly at the central pivots thereof to move the lower panel downwardly, thereby clamping the upper and lower molds on the intermediate and upper panels.

When the motor rotates reversely, the ball screws come nearer to each other, moving the joints of the toggle arms outwardly, lowering the lower panel to open the upper and lower molds.

The toggle arms may be set in motion by a fluid pressure actuator to open and clamp the molds.

BRIEF DESCRIPTION OF THE DRAWINGS

FIGS. 6(A) to 6(C) respectively show directions of forces applied by the toggle type mold clamping system of FIG. 5.

DETAILED DESCRIPTION

Figure 1:
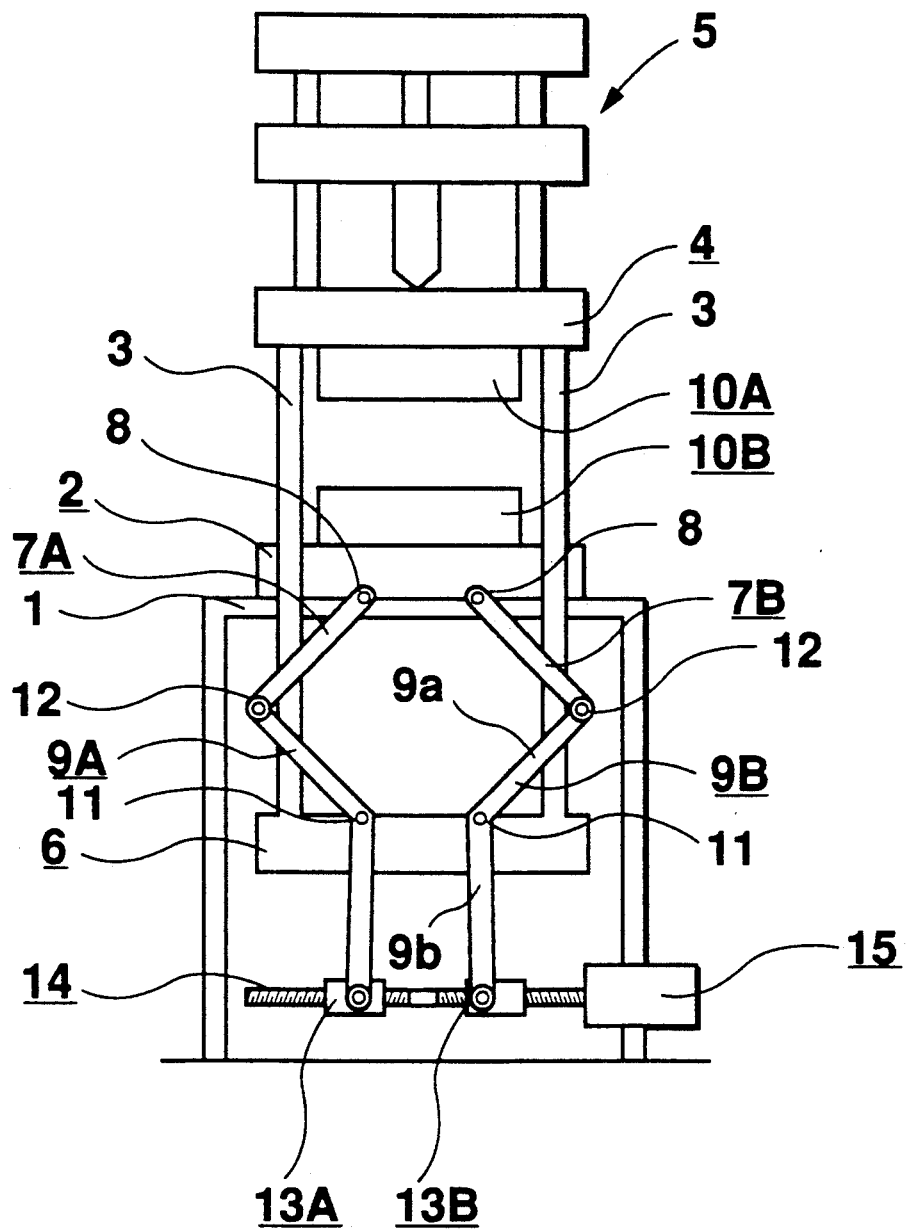
FIG. 1 is a cross-sectional view of a vertical injection molding machine including a toggle type mold clamping system according to a first embodiment of this invention, in which ball screws are used as a drive mechanism.

This invention will be described with reference to a first embodiment shown in FIGS. 1, 2(A), 2(B), and 2(C).

A toggle type mold clamping system comprises a frame 1 placed on a floor, an intermediate panel 2 fixedly attached on the frame 1, a plurality of tie rods 3 inserted through vertical holes of the intermediate panel 2 to be axially movable, and an upper panel 4 fixedly and horizontally coupled to the tie rods 3. A plasticizing unit 5 is mounted on the upper panel 4 facing downwards. A lower panel 6 is horizontally connected to the lower ends of the tie rods 3. Upper and lower molds 10A and 10B are attached on the lower surface of the upper panel 4 and on the upper surface of the intermediate panel 2, respectively, in a confronting manner.

Upper ends of a pair of toggle rods 7A, 7B are separately and pivotally connected via pins 8 to a lower surface of the intermediate panel 2. A pair of toggle arms 9A, 9B are in the shape of sideways V. The toggle arms 9A, 9B at bends thereof are pivotally coupled to the lower panel 6 via pins 11. The toggle arms 9A, 9B are divided into upper portions 9a and lower portions 9b at the bends. The upper portions 9a of the toggle arms 9A, 9B are as long as the toggle rods 7A, 7B. The lower portions 9b of the toggle arms 9A, 9B are longer than the upper portions 9a. Lower ends of the toggle rods 7A, 7B are pivotally coupled to upper ends of the toggle arms 9A, 9B via coupling pins 12 at a central portion between the intermediate panel 2 and the lower panel 6, serving as a bendable toggle link mechanism.

A left-handed ball screw 13A and a right-handed ball screw 13B are respectively coupled to the lower ends of the toggle arms 9A, 9B. The ball screws 13A, 13B are movably supported so as to be always horizontal in the axial direction. A threaded shaft unit 14 including a front left-handed shaft and a rear right-handed shaft is fitted through the ball screws 13A, 13B. One end of the threaded shaft unit 14 is coupled to an output shaft of a motor 15.

In operation, when the threaded shaft unit 14 is turned clockwise by the motor 15, the ball screws 13A, 13B are moved outwardly so as to be apart from each other. Then the toggle arms 9A, 9B are inwardly turned centrally of the pins 11, reducing the distance between the coupling pins 12, gradually enlarging a bend angle $\alpha$ between each toggle rod and each toggle arm, the moving the lower panel 6 downwards, and lowering the upper panel 4 via the tie rods 3. Under this condition, the molds 10A, 10B are clamped by the clamping force $F_0$ shown in FIG. 2(A), completing the mold clamping process.

After the injection molding process, the threaded shaft unit 14 is turned counterclockwise by the motor 15, moving the ball screws 13A, 13B inwards to reduce the distance between them. The joints at the upper ends of the toggle arms 9A, 9B are turned outwards, gradually opening the molds 10A, 10B as shown in FIG. 2(B), and eventually opening them completely as shown in FIG. 2(C).

When the vertical injection molding machine includes a plasticizing unit 5 mounted on the upper panel 4, a larger force is required in order to open the molds.

Figure 2:
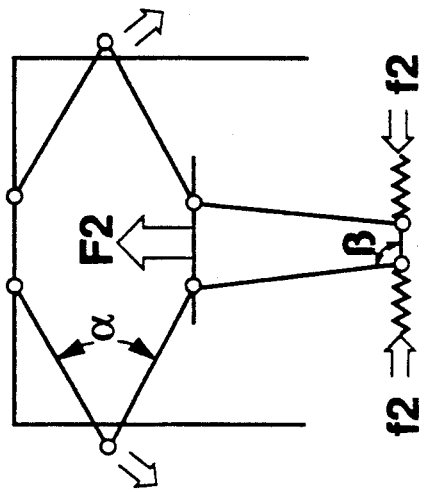
FIGS. 2(A) to 2(C) respectively show directions of forces applied by the toggle type mold clamping system of FIG. 1.
Figure 2:
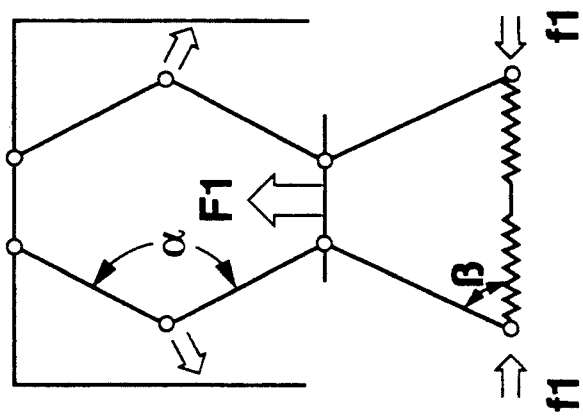
Figure 2:
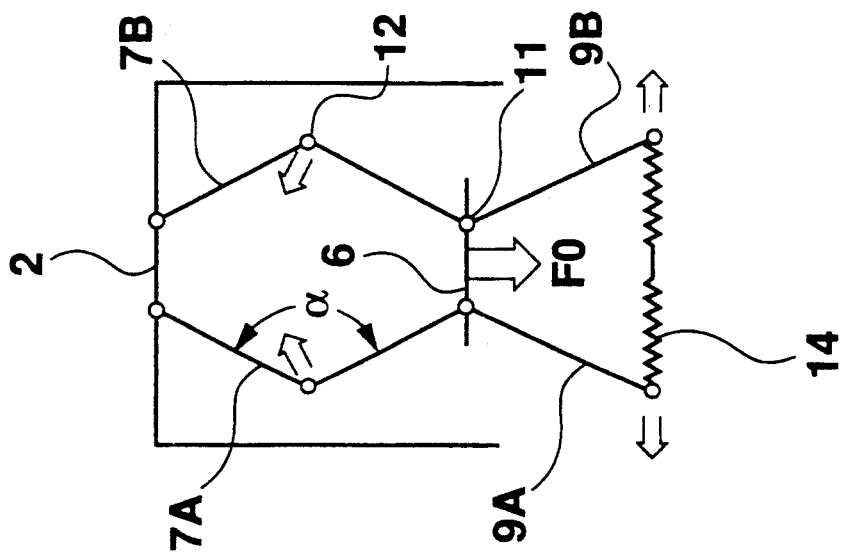

To equalize the force $F_1$ to open the mold (when the bend angle $\alpha$ is large as shown in FIG. 2(B)), and the force $F_2$ for completing the mold opening (when the bend angle $\alpha$ is small as shown in FIG. 2(C)), it is necessary with the conventional system that the thrust $f_2$ should be larger than the thrust $f_1$ when the bend angle $\alpha$ is small. With this invention, the smaller the bend angle $\alpha$, the larger an angle $\beta$ between the lower toggle arms 9b and the threaded shaft unit 14, so that the thrust $f_1$ can work effectively. Even when the largest thrust is required as in the case shown in FIG. 2(C), the motor 15 having a relatively small torque can produce the force necessary to open the molds or keep the molds open. In addition, since the lower toggle arms 9b are longer than the upper toggle arms 9a, a motor having an even smaller torque can be used because of the lever ratio.

Figure 3:
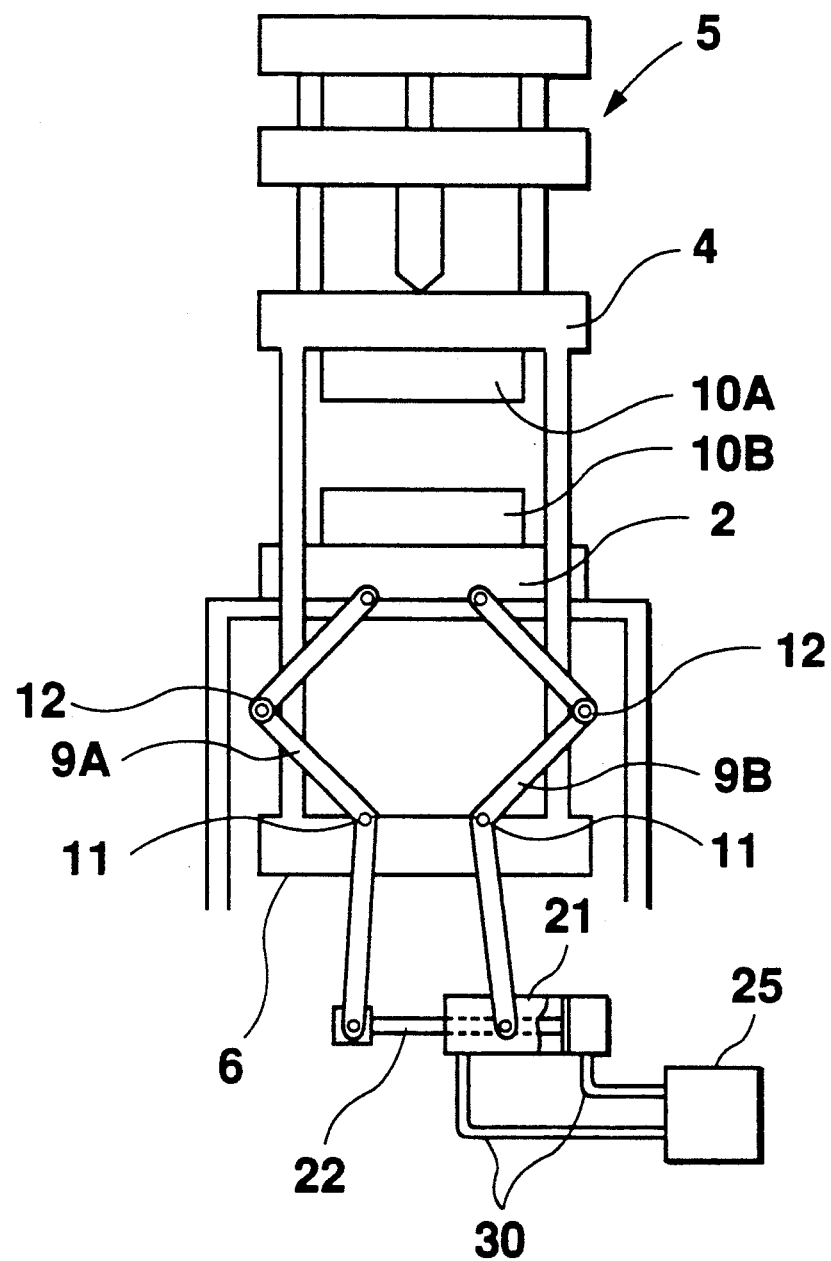
FIG. 3 is a cross-sectional view of a vertical injection molding machine including a toggle type mold clamping system according to a second embodiment, in which the driving mechanism is a fluid pressure actuator.

A second embodiment of this invention will be described with reference to FIG. 3.

The second embodiment differs from the first embodiment only in that a fluid pressure actuator is used for the drive mechanism. The actuator is positioned at the lower end of the toggle arms.

The fluid pressure actuator 21 is horizontally and pivotally coupled to the lower end of the toggle arm 9B so that the central portion of the actuator 21 can make a to and fro motion. One end of a piston 22 of the actuator 21 is coupled to the lower end of the toggle arm 9A in order to make a to and fro motion. A fluid pressure applying unit 25 is connected to the actuator 21 via pipes 30, applying the pressurised fluid to the actuator 21.

In operation, the fluid pressure applying unit 25 applies the pressurised fluid to a rear cavity of the actuator 21, advancing the piston 22, and moving the lower portions of the toggle arms 9A, 9B outwardly to increase the distance between them. The joints at the upper ends of the toggle arms 9A, 9B are inwardly turned centrally of the pins 11, reducing the distance between the coupling pins 12, lowering the lower panel 6, and moving the upper panel 4 downwardly to clamp the molds 10A, 10B.

Figure 4:
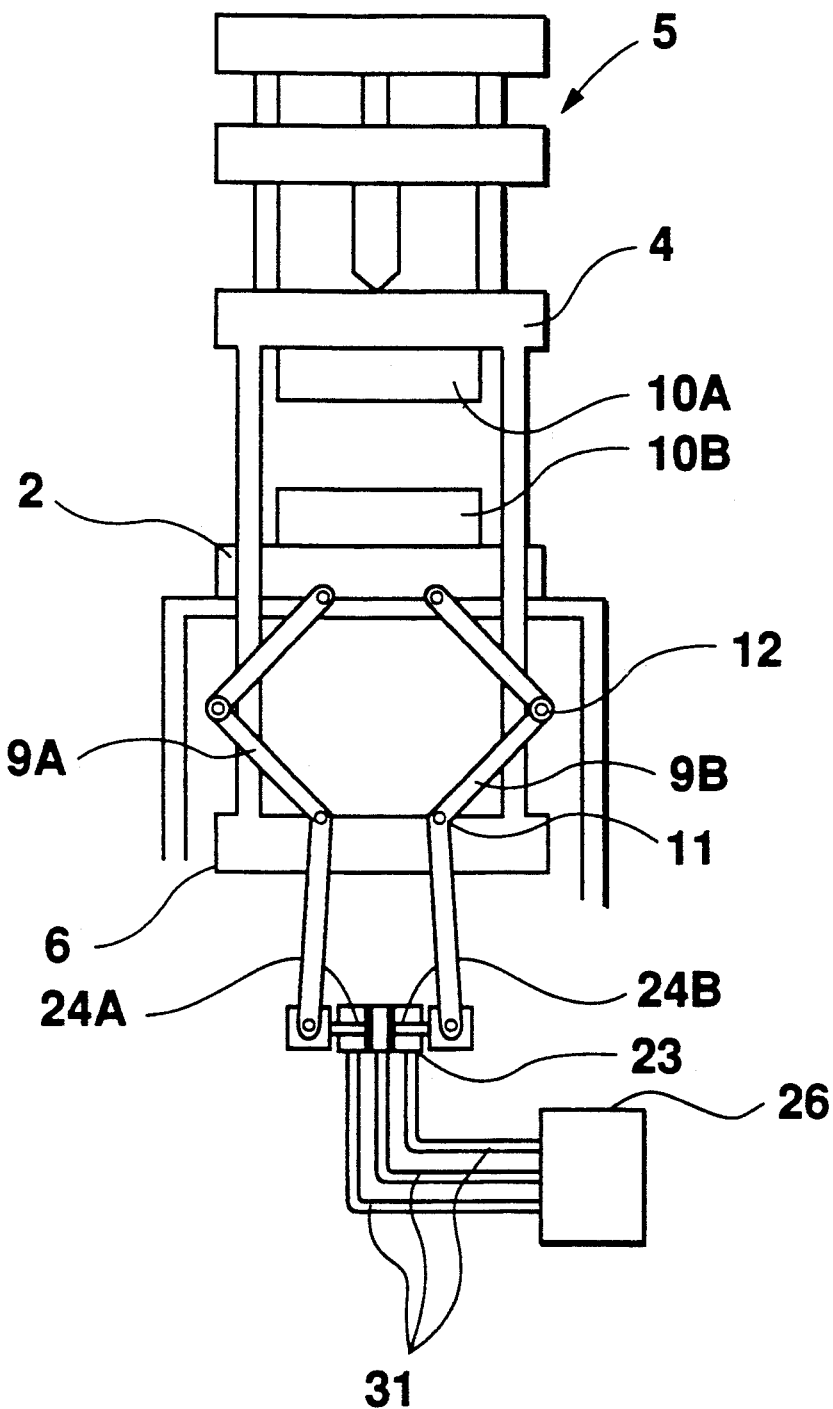
FIG. 4 is a cross-sectional view of a vertical injection molding machine including a toggle type mold clamping system according to a third embodiment, in which the driving mechanism is a fluid pressure actuator.
Figure 5:
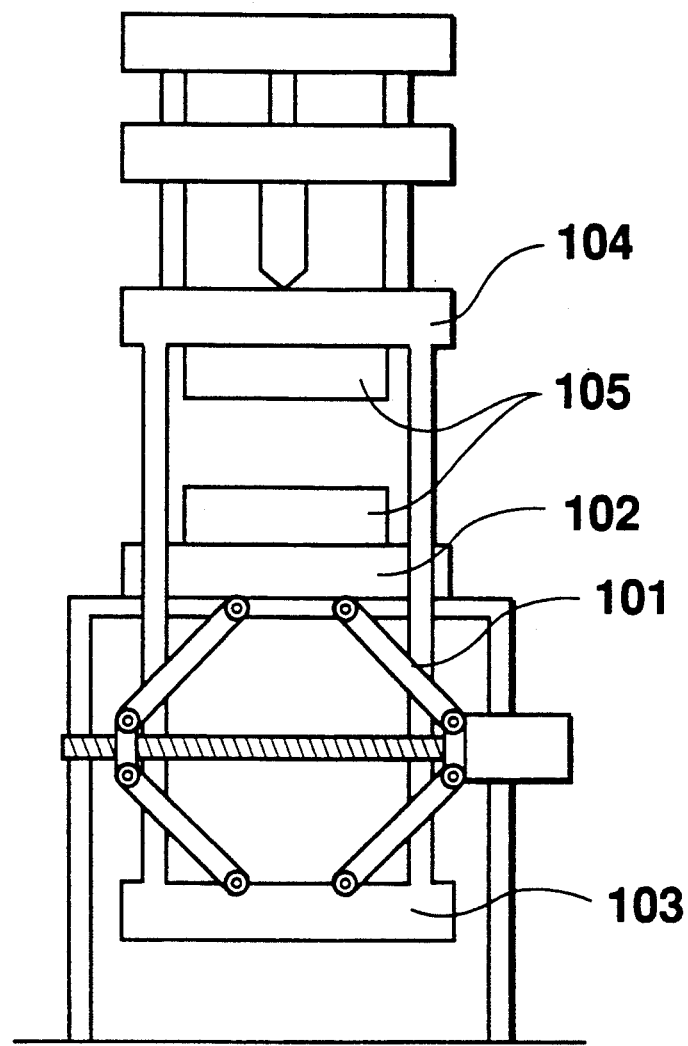
FIG. 5 is a cross-sectional view of a vertical injection molding machine including a conventional toggle type mold clamping system.

In a third embodiment shown in FIG. 4, a pair of pistons 24A, 24B which are movable in opposite directions are connected to a fluid pressure actuator 23. A fluid pressure applying unit 26 is connected to the actuator 23 via pipes 31. The pistons 24A, 24B are pivotally coupled to the lower ends of the toggle arms 9A, 9B, respectively, so that the distance between the lower ends of the toggle arms is widened when the pressurised fluid is applied to the central cavity of the actuator 23. Then the lower and upper panels 6, 4 are moved downwardly to clamp the molds 10A, 10B.

According to this invention, the toggle arms are operated by the drive mechanism employing either ball screws and a motor or a fluid pressure acutator positioned below the lower panel, so that the lower panel is moved downwardly to clamp the molds on the upper and intermediate panels. Therefore, the space under the frame of the toggle type mold clamping system can be efficiently used to perform the foregoing operation, thereby making the whole system compact in the vertical direction.

The capacity of the drive mechanism can be minimized since the lever ratio of the toggle arms is optimised and the thrust of the drive mechanism can be effectively used to turn the toggle arms.

What is claimed is:

1. A toggle type mold clamping system comprising:
   (a) an upper panel for fixedly mounting an upper injection mold thereon;
   (b) an intermediate panel for fixedly mounting a lower injection mold thereon;
   (c) a frame for fixedly mounting said intermediate panel thereon;
   (d) a lower panel coupled to said upper panel via a plurality of tie rods;
   (e) a toggle link mechanism including a pair of toggle rods whose first ends are pivotally coupled to pins extending from said intermediate panel, and a pair of toggle arms which are in the shape of a sideways V, the bends of which are pivotally supported by pins extending from said lower panel, first ends of which are pivotally coupled to second ends of said toggle rods via coupling pins; and
   (f) a drive mechanism for driving said toggle link mechanism, said driving mechanism being coupled to second ends of said pair of toggle arms.

2. A toggle type mold clamping system according to claim 1, wherein said driving mechanism includes:
   (a) a right-handed nut and a left-handed nut which are pivotally coupled to said second ends of said pair of toggle arms;
   (b) a threaded shaft unit including a right-handed shaft and a left-handed shaft to be engaged with said right-handed nut and said left-handed nut, respectively; and
   (c) a motor for turning said threaded shaft unit.

3. A toggle type mold clamping system according to claim 1, wherein said drive mechanism includes:

(a) a right-handed ball screw and a left-handed ball screw which are pivotally coupled to said second ends of said pair of toggle arms;

(b) a threaded shaft unit including a right-handed shaft and a left-handed shaft to be engaged with said right-handed ball screw and said left-handed ball screw, respectively; and (c) a motor for turning said threaded shaft unit.

4. A toggle type mold clamping system according to claim 1, wherein said toggle link driving mechanism includes:

(a) a fluid pressure actuator having a cylinder and a piston, said cylinder and said piston being pivotally coupled to said second ends of said pair of toggle arms; and (b) a fluid pressure applying unit for applying a fluid pressure to said fluid pressure actuator.

5. A toggle type mold clamping system according to claim 1, wherein said toggle link driving mechanism includes:

(a) a fluid pressure actuator having a cylinder and two pistons, said pistons being pivotally coupled to said second ends of said pair of toggle arms; and (b) a fluid pressure applying unit for applying a fluid pressure to said fluid pressure actuator.

* * * * *